(12) United States Patent
Moon et al.

(10) Patent No.: US 11,808,556 B2
(45) Date of Patent: Nov. 7, 2023

(54) APPARATUS AND METHOD FOR INTEGRATED CONTROL OF IGNITION OF FIREWORKS PRODUCTS AND FLIGHT OF UNMANNED AERIAL VEHICLES FOR FIREWORKS SHOW

(71) Applicants: HANWHA CORPORATION, Seoul (KR); PABLO AIR Co., Ltd., Incheon (KR)

(72) Inventors: Bum Suck Moon, Goyang-si (KR); Jang Cheol Lee, Seoul (KR); Du Yeon Yoon, Seoul (KR); Seong Bok Kim, Gongju-si (KR); Young Joon Kim, Incheon (KR)

(73) Assignees: HANWHA CORPORATION, Seoul (KR); PABLO AIR Co., Ltd., Incheon (KR)

( * ) Notice: Subject to any disclaimer, the term of this patent is extended or adjusted under 35 U.S.C. 154(b) by 66 days.

(21) Appl. No.: 17/527,338

(22) Filed: Nov. 16, 2021

(65) Prior Publication Data
US 2023/0152068 A1 May 18, 2023

(51) Int. Cl.
*F42B 4/24* (2006.01)
*G08G 5/00* (2006.01)
(Continued)

(52) U.S. Cl.
CPC ............. *F42B 4/24* (2013.01); *B64C 39/024* (2013.01); *G05D 1/104* (2013.01); *G08G 5/0013* (2013.01);
(Continued)

(58) Field of Classification Search
CPC .......... F42B 4/00; F42B 4/06–14; F42B 4/24; B64C 39/024; B64U 2201/00–20;
(Continued)

(56) References Cited

U.S. PATENT DOCUMENTS 10,723,454 B1 * 7/2020 Hovey ...................... A63J 5/02
2006/0229773 A1 * 10/2006 Peretz .................... A62C 27/00
340/425.5
(Continued)

FOREIGN PATENT DOCUMENTS

AT            519937 B1 *  2/2020  ........... B64C 39/024
JP     2020-518498 A     6/2020
(Continued)

*Primary Examiner* — Bret Hayes
(74) *Attorney, Agent, or Firm* — WHDA, LLP (57) ABSTRACT

Proposed are an apparatus and a method for integrated control of ignition of fireworks products and flight of unmanned aerial vehicles for a fireworks show, the apparatus including: an information input part configured to receive flight information of the multiple unmanned aerial vehicles and ignition information of the fireworks products provided at the respective multiple unmanned aerial vehicles; an unmanned aerial vehicle flight controller configured to generate flight control signals on the basis of the received flight information of the unmanned aerial vehicles; a fireworks product ignition controller configured to generate ignition control signals on the basis of the received ignition information of the fireworks products; and a state information receiver configured to receive in real time flight state information of the unmanned aerial vehicles that have received the generated flight control signals, and ignition state information of the fireworks products that have received the generated ignition control signals.

10 Claims, 9 Drawing Sheets

(51) Int. Cl.
*G05D 1/10* (2006.01)
*B64C 39/02* (2023.01)
*B64U 10/13* (2023.01)
*B64U 101/00* (2023.01)

(52) U.S. Cl.
CPC ........... *G08G 5/0043* (2013.01); *B64U 10/13* (2023.01); *B64U 2101/00* (2023.01); *B64U 2201/20* (2023.01)

(58) Field of Classification Search
CPC ............ B64U 2101/00; B64U 2101/18; B64U 2101/24; G05D 1/104; G08G 5/0013; G08G 5/0043
USPC .......................................... 102/347–352, 356
See application file for complete search history.

(56) References Cited

U.S. PATENT DOCUMENTS

| | | | | |
|---|---|---|---|---|
| 2010/0096491 | A1* | 4/2010 | Whitelaw | B64G 1/00 725/75 |
| 2017/0053535 | A1* | 2/2017 | Lee | G08G 5/045 |
| 2019/0146501 | A1* | 5/2019 | Schick | B64C 39/024 701/3 |
| 2019/0391575 | A1* | 12/2019 | Hortner | B64C 39/024 |

FOREIGN PATENT DOCUMENTS

| | | |
|---|---|---|
| KR | 10-2016-0111670 A | 9/2016 |
| KR | 10-2016-0142686 A | 12/2016 |
| KR | 10-1894409 B1 | 9/2018 |
| KR | 10-2019-0092787 A | 8/2019 |

* cited by examiner

Fig.2

| 00000018 : | 6504 96fb ee03 | 0000 0000 0000 | 6504 96fb f603 7f00 7f00 7f00 |
| 00000030 : | 6504 96fb 0204 | ff00 ff00 ff00 | 6504 96fb 1004 ff00 ff00 ff00 |
| 00000048 : | 6504 96fb 2104 | ff00 ff00 ff00 | 6504 96fb 3504 ff00 ff00 ff00 |
| 00000060 : | 6504 96fb 4c04 | ff00 ff00 ff00 | 6504 96fb 6504 ff00 ff00 ff00 |
| 00000078 : | 6504 96fb 8004 | ff00 ff00 ff00 | 6504 96fb 9e04 ff00 ff00 ff00 |
| 00000090 : | 6504 96fb be04 | ff00 ff00 ff00 | 6504 96fb e004 ff00 ff00 ff00 |
| 000000a8 : | 6504 96fb 0405 | ff00 ff00 ff00 | 6504 96fb 2a05 ff00 ff00 ff00 |
| 000000c0 : | 6504 96fb 5105 | ff00 ff00 ff00 | 6504 96fb 7a05 ff00 ff00 ff00 |
| 000000d8 : | 6504 96fb a405 | ff00 ff00 ff00 | 6504 96fb d005 ff00 ff00 ff00 |

APPARATUS AND METHOD FOR INTEGRATED CONTROL OF IGNITION OF FIREWORKS PRODUCTS AND FLIGHT OF UNMANNED AERIAL VEHICLES FOR FIREWORKS SHOW

BACKGROUND OF THE INVENTION

Field of the Invention

The present disclosure relates to an apparatus and a method for integrated control of ignition of fireworks products and flight of unmanned aerial vehicles for a fireworks show. More particularly, the present disclosure relates to an apparatus and a method for integrated control of ignition of fireworks products and flight of unmanned aerial vehicles for a fireworks show, wherein the apparatus and the method generate flight control signals and ignition control signals on the basis of received flight information of the unmanned aerial vehicles and received ignition information of the fireworks products so as to control flight of the unmanned aerial vehicles and ignition of the fireworks products.

Description of the Related Art

With development of robot technology, robots for home or education that can be easily used in general home have been launched. The robots act as a conversational partner in the home or perform functions as multimedia devices. In addition, the robots recognize a user's voice to communicate with the user intelligently, and have mobility to move freely avoiding obstacles. The robots are provided with an autonomous movement means, such as arms or legs, to make emotional movements while speaking.

Recently, robots for a show have been introduced, but the technical level of the robots for a show is still low. Therefore, performances using the robots for a show are also at a very monotonous level so far.

In the meantime, an unmanned aerial vehicle (UAV) or an unmanned aircraft, which is also called a drone, refers to a flight vehicle that flies autonomously without a pilot on board or that flies through remote control from a long distance.

Unlike a general flight vehicle, the unmanned aerial vehicle is not provided with a space for a pilot and a safety device, thus facilitating reduction in size and weight. Recently, unmanned aerial vehicles have been used widely in private fields such as broadcasting, shows, pesticide spraying, and fire suppression.

However, regarding unmanned aerial vehicles used for a fireworks festival show, it is possible to simultaneously ignite fireworks products attached on multiples unmanned aerial vehicles, but it is impossible to ignite a fireworks product attached on one unmanned aerial vehicle several times or to ignite the same at a specific time.

Regarding this, Korean Patent Application Publication No. 10-2016-0111670 discloses "SYSTEM AND METHOD FOR CONTROLLING FLIGHT OF UNMANNED AERIAL VEHICLE".

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing an apparatus and a method for integrated control of ignition of fireworks products and flight of unmanned aerial vehicles for a fireworks show, the apparatus and the method generating flight control signals on the basis of received flight information of the unmanned aerial vehicles.

In addition, the present disclosure is directed to providing an apparatus and a method for integrated control of ignition of fireworks products and flight of unmanned aerial vehicles for a fireworks show, the apparatus and the method generating ignition control signals on the basis of received ignition information of the fireworks products.

In addition, the present disclosure is directed to providing an apparatus and a method for integrated control of ignition of fireworks products and flight of unmanned aerial vehicles for a fireworks show, the apparatus and the method receiving in real time flight state information of the unmanned aerial vehicles that have received generated flight control signals and ignition state information of the fireworks products that have received generated ignition control signals, so as to change flight modes of the unmanned aerial vehicles to manual flight modes or to adjust ignition operations of the fireworks products for control.

In addition, the present disclosure is directed to providing an apparatus and a method for integrated control of ignition of fireworks products and flight of unmanned aerial vehicles for a fireworks show, the apparatus and the method setting position correction values of the unmanned aerial vehicles by applying center-of-gravity change values of the unmanned aerial vehicles that occur according to ignition of the fireworks products, and by applying limit values of momentary change dimensions of the fireworks products.

According to the present disclosure, there is provided an apparatus for integrated control of ignition of fireworks products and flight of unmanned aerial vehicles for a fireworks show, the apparatus including: an information input part configured to receive flight information of the multiple unmanned aerial vehicles and ignition information of the fireworks products provided at the respective multiple unmanned aerial vehicles; an unmanned aerial vehicle flight controller configured to generate flight control signals on the basis of the received flight information of the unmanned aerial vehicles; a fireworks product ignition controller configured to generate ignition control signals on the basis of the received ignition information of the fireworks products; and a state information receiver configured to receive in real time flight state information of the unmanned aerial vehicles that have received the generated flight control signals, and ignition state information of the fireworks products that have received the generated ignition control signals.

In addition, the information input part may include: a flight information receiver configured to receive, from a manager terminal, the flight information including at least one selected from a group of flight positions, flight paths, and speeds of the multiple unmanned aerial vehicles; and an ignition information receiver configured to receive, from the manager terminal, the ignition information including at least one selected from a group of ignition time points and the number of ignitions of the multiple fireworks products.

In addition, the unmanned aerial vehicle flight controller may include: a flight control signal generator configured to generate the flight control signals on the basis of the received flight information of the multiple unmanned aerial vehicles; a flight control signal converter configured to convert the generated flight control signals into a supported format corresponding to the unmanned aerial vehicles; and a flight mode adjustment part configured to analyze real-time state information received from the unmanned aerial vehicles to determine flight states of the unmanned aerial vehicles, and adjust flight modes of the unmanned aerial vehicles for control on the basis of a result of determination.

In addition, the flight mode adjustment part may be configured to determine whether the unmanned aerial vehicles are out of paths thereof, on the basis of the flight state information received from the unmanned aerial vehicles which includes at least one selected from a group of unique numbers, speeds, wind speeds, and current positions to which position correction values according to ignition of the fireworks products are applied; and output, when determining that at least one of the unmanned aerial vehicles is out of the path, a mode adjustment control signal for changing the flight mode of the at least one of the unmanned aerial vehicles to a manual flight mode.

In addition, the fireworks product ignition controller may include: an ignition control signal generator configured to generate the ignition control signals on the basis of the received ignition information of the multiple fireworks products; an ignition control signal converter configured to convert the generated ignition control signals into a supported format corresponding to the fireworks products; and an ignition operation adjustment part configured to analyze real-time state information received from the fireworks products to determine ignition states of the fireworks products, and adjust ignition operations of the fireworks products for control on the basis of a result of determination.

In addition, the ignition operation adjustment part may be configured to determine whether ignition of the fireworks products is abnormal, on the basis of the ignition state information received from the fireworks products which includes at least one selected from a group of unique numbers, current positions, speeds, wind speeds, and previous ignition history information; and output, when determining that ignition of at least one of the fireworks products is abnormal, an operation adjustment control signal for stopping the ignition operation of the at least one of the fireworks products for adjustment.

In addition, the state information receiver may be configured to receive the flight state information from the unmanned aerial vehicles and the ignition state information from the fireworks products, wherein the flight state information may include at least one selected from a group of unique numbers, speeds, wind speeds, and current positions to which position correction values according to ignition of the fireworks products are applied, and the ignition state information may include at least one selected from a group of unique numbers, current positions, speeds, wind speeds, and previous ignition history information.

In addition, each of the unmanned aerial vehicles may include: a flight controller configured to receive the flight control signal converted according to a supported format corresponding to the unmanned aerial vehicles, and make the unmanned aerial vehicle fly on the basis of the received flight control signal, the flight controller adjusting a flight mode for control when a mode adjustment control signal is received; an ignition controller configured to receive the ignition control signal converted according to a supported format corresponding to the fireworks products, and ignite the fireworks product provided at the unmanned aerial vehicle on the basis of the received ignition control signal, the ignition controller adjusting an ignition operation of the fireworks product for control when an operation adjustment control signal is received; a state information collector configured to collect the flight state information and the ignition state information of the fireworks product in real time; a state information transmitter configured to transmit the collected flight state information and the collected ignition state information of the fireworks product; and an adjustment control signal receiver configured to receive the transmitted mode adjustment control signal and the transmitted operation adjustment control signal.

According to the present disclosure, there is provided a method for integrated control of ignition of fireworks products and flight of unmanned aerial vehicles for a fireworks show, the method including: receiving, by an information input part, flight information of the multiple unmanned aerial vehicles and ignition information of the fireworks products provided at the respective multiple unmanned aerial vehicles; generating, by an unmanned aerial vehicle flight controller, flight control signals on the basis of the received flight information of the unmanned aerial vehicles; generating, by a fireworks product ignition controller, ignition control signals on the basis of the received ignition information of the fireworks products; and receiving in real time, by a state information receiver, flight state information of the unmanned aerial vehicles that have received the generated flight control signals and ignition state information of the fireworks products that have received the generated ignition control signals.

In addition, the generating of the flight control signals on the basis of the received flight information of the unmanned aerial vehicles may include: generating the flight control signals on the basis of the received flight information of the multiple unmanned aerial vehicles; converting the generated flight control signals into a supported format corresponding to the unmanned aerial vehicles; and analyzing real-time state information received from the unmanned aerial vehicles to determine flight states of the unmanned aerial vehicles, and adjusting flight modes of the unmanned aerial vehicles for control on the basis of a result of determination.

In addition, at the analyzing of the real-time state information received from the unmanned aerial vehicles to determine the flight states of the unmanned aerial vehicles, and the adjusting of the flight modes of the unmanned aerial vehicles for control on the basis of the result of determination, whether the unmanned aerial vehicles are out of paths thereof may be determined on the basis of the flight state information received from the unmanned aerial vehicles that includes at least one selected from a group of unique numbers, speeds, wind speeds, and current positions to which position correction values according to ignition of the fireworks products are applied, and when it is determined that at least one of the unmanned aerial vehicles is out of the path, a mode adjustment control signal for changing the flight mode of the at least one of the unmanned aerial vehicles to a manual flight mode may be output.

In addition, the generating of the ignition control signals on the basis of the received ignition information of the fireworks products may include: generating the ignition control signals on the basis of the received ignition information of the multiple fireworks products; converting the generated ignition control signals into a supported format corresponding to the fireworks products; and analyzing real-time state information received from the fireworks products to determine ignition states of the fireworks products, and adjusting ignition operations of the fireworks products for control on the basis of a result of determination.

In addition, at the analyzing of the real-time state information received from the fireworks products to determine the ignition states of the fireworks products, and the adjusting of the ignition operations of the fireworks products for control on the basis of the result of determination, whether ignition of the fireworks products is abnormal may be determined on the basis of the ignition state information received from the fireworks products that includes at least one selected from a group of unique numbers, current positions, speeds, wind speeds, and previous ignition history information, and when it is determined that ignition of at least one of the fireworks products is abnormal, an operation adjustment control signal for stopping the ignition operation of the at least one of the fireworks products for adjustment may be output.

According to the apparatus and the method for integrated control of ignition of fireworks products and flight of unmanned aerial vehicles for a fireworks show according to the present disclosure, the flight control signals are generated on the basis of the received flight information of the unmanned aerial vehicles and the ignition control signals are generated on the basis of the received ignition information of the fireworks products, so that flight of the unmanned aerial vehicles and ignition of the fireworks products provided at the respective unmanned aerial vehicles can be controlled simultaneously, thus facilitating elaborate presentations.

According to the present disclosure, the position correction values of the unmanned aerial vehicles are set by applying the center-of-gravity change values of the unmanned aerial vehicles that occur according to ignition of the fireworks products, and by applying the limit values of the momentary change dimensions of the fireworks products, so that stable flight can be made despite ignition of fireworks products.

According to the present disclosure, the flight state information of the unmanned aerial vehicles that have received the generated flight control signals is received in real time, whether the unmanned aerial vehicles are out of the paths thereof is determined on the basis of the received flight state information, and when it is determined that at least one of the unmanned aerial vehicles is out of the path, the flight mode of the at least one of the unmanned aerial vehicles is changed to the manual flight mode, thereby quickly dealing with the occurrence of unexpected situations.

In addition, according to the present disclosure, the ignition state information of the fireworks products that have received the generated ignition control signals is received in real time, whether ignition of the fireworks products is abnormal is determined on the basis of the received ignition state information, and when it is determined that ignition of at least one of the fireworks products is abnormal, an ignition operation of the at least one of the fireworks products is selectively stopped for adjustment, thereby quickly dealing with the occurrence of unexpected situations.

In this way, the present disclosure can expand the range of presentation space beyond spatial limitation on presentations with fireworks products, and can achieve a variety of fireworks presentations through several (unlimited) ignitions of fireworks products.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

A variety of modifications may be made to the present disclosure and there are various embodiments of the present disclosure, examples of which will now be provided with reference to drawings and described in detail.

However, the present disclosure is not limited thereto, and the exemplary embodiments can be construed as including all modifications, equivalents, or substitutes in a technical concept and a technical scope of the present disclosure. The similar reference numerals refer to the similar elements described in the drawings.

It will be understood that when an element is referred to as being "coupled" or "connected" to another element, it can be directly coupled or connected to the other element or intervening elements may be present therebetween. In contrast, it will be understood that when an element is referred to as being "directly coupled" or "directly connected" to another element, there are no intervening elements present.

The terms used in the present specification are merely used to describe particular embodiments, and are not intended to limit the present disclosure. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, exemplary embodiments of the present disclosure will be described in detail with reference to the accompanying drawings. Hereinafter, the same elements in the drawings are denoted by the same reference numerals, and a repeated description of the same elements will be omitted.

Figure 1:
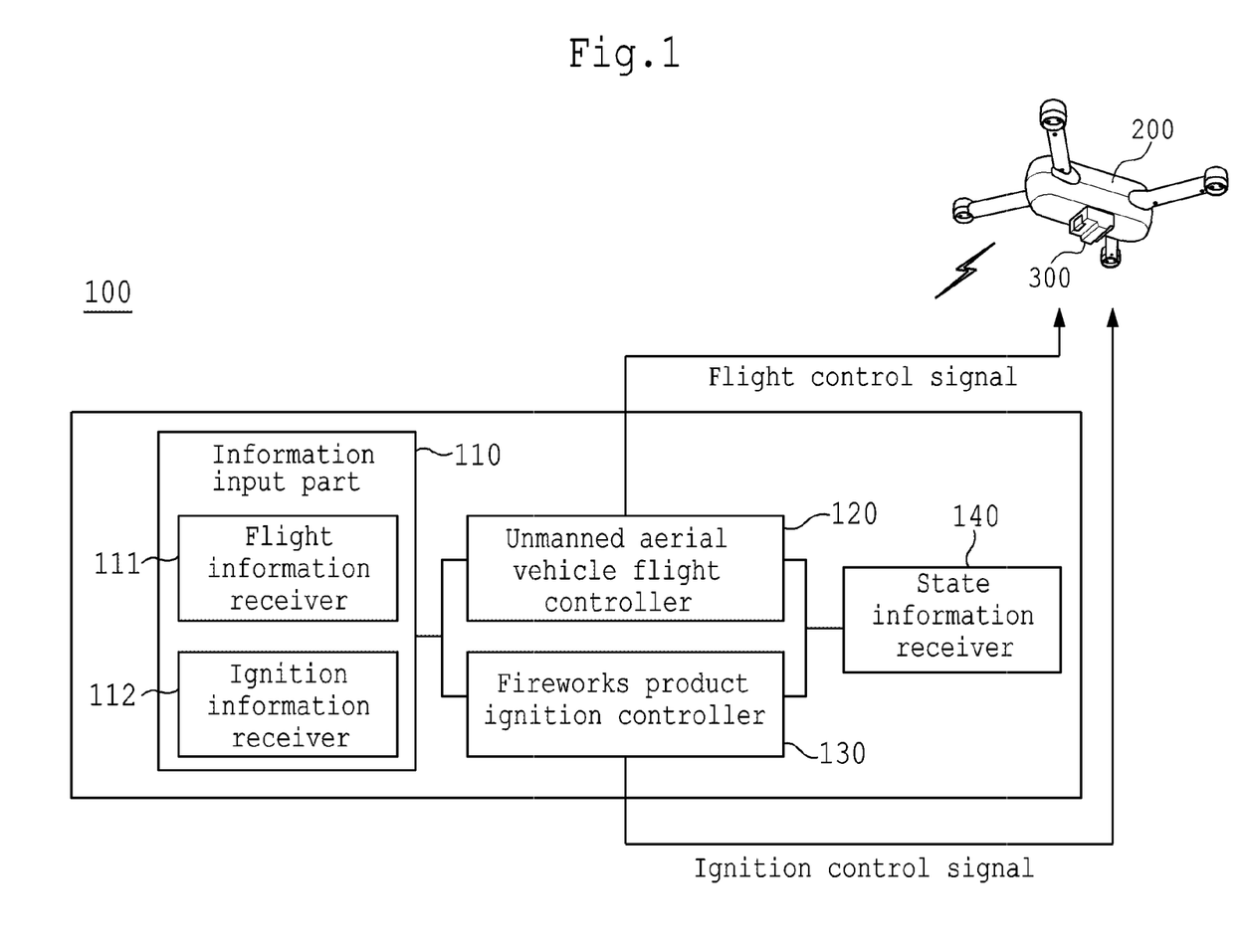
FIG. 1 is a diagram illustrating a configuration of an apparatus for integrated control of ignition of fireworks products and flight of unmanned aerial vehicles for a fireworks show according to the present disclosure.
Figure 2:
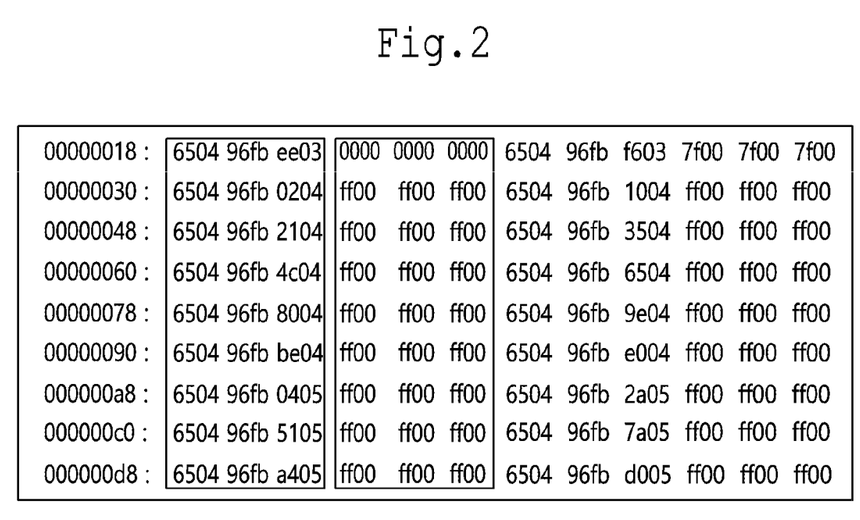
FIG. 2 is a diagram illustrating a signal system for a flight control signal and an ignition control signal that are generated in an apparatus for integrated control of ignition of fireworks products and flight of unmanned aerial vehicles for a fireworks show according to the present disclosure.

FIG. 1 is a diagram illustrating a configuration of an apparatus for integrated control of ignition of fireworks products and flight of unmanned aerial vehicles for a fireworks show according to the present disclosure. FIG. 2 is a diagram illustrating a signal system for a flight control signal and an ignition control signal that are generated in an apparatus for integrated control of ignition of fireworks products and flight of unmanned aerial vehicles for a fireworks show according to the present disclosure.

Referring to FIG. 1, an apparatus 110 for integrated control of ignition of fireworks products and flight of unmanned aerial vehicles for a fireworks show according to the present disclosure schematically includes: an information input part 110, an unmanned aerial vehicle flight controller 120, a fireworks product ignition controller 130, and a state information receiver 140. Herein, the appearance of an unmanned aerial vehicle 200 is composed of a body and a fireworks product 300 provided at the body in a detachably attached manner. Herein, the fireworks product 300 may be a firework or an LED light used for fireworks, but is not limited thereto.

The information input part 110 receives flight information of multiple unmanned aerial vehicles and ignition information of fireworks products provided at the respective multiple unmanned aerial vehicles.

To this end, the information input part 110 includes a flight information receiver 111 and an ignition information receiver 112.

The flight information receiver 111 receives flight information from a manager terminal, wherein the flight information includes at least one selected from the group of flight positions, flight paths, speeds of the multiple unmanned aerial vehicles, and center-of-gravity change values thereof according to the ignition of the fireworks products.

The ignition information receiver 112 receives ignition information from the manager terminal, wherein the ignition information includes at least one selected from the group of ignition time points, the number of ignitions, and momentary change dimensions of the multiple fireworks products.

The unmanned aerial vehicle flight controller 120 generates flight control signals for control on the basis of the received flight information of the unmanned aerial vehicles.

The fireworks product ignition controller 130 generates ignition control signals for control on the basis of the received ignition information of the fireworks products.

The flight control signals and the ignition control signals generated as described above are configured as shown in FIG. 2, and individual signals are combined to generate multiple signals.

The state information receiver 140 receives in real time flight state information of the unmanned aerial vehicles that have received the generated flight control signals, and receives in real time ignition state information of the fireworks products that have received the generated ignition control signals.

More specifically, the state information receiver 140 receives the flight state information from the unmanned aerial vehicles and the ignition state information from the fireworks products. The flight state information includes at least one selected from the group of unique numbers, speeds, wind speeds, and current positions to which position correction values according to the ignition of the fireworks products are applied. The ignition state information includes at least one selected from the group of unique numbers, current positions, speeds, wind speeds, and previous ignition history information.

Figure 3:
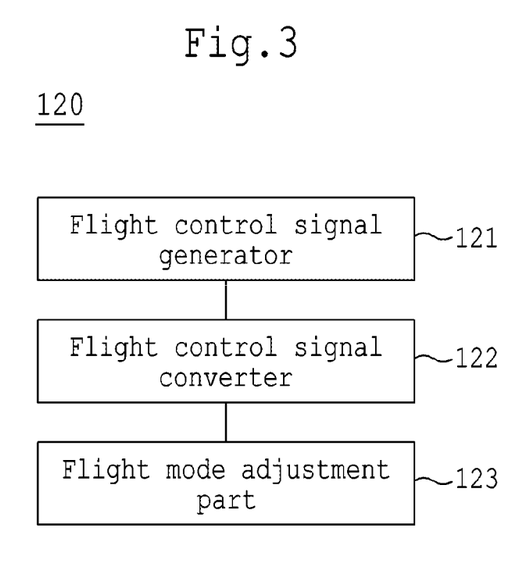
FIG. 3 is a diagram illustrating a detailed configuration of an unmanned aerial vehicle flight controller in an apparatus for integrated control of ignition of fireworks products and flight of unmanned aerial vehicles for a fireworks show according to the present disclosure.

FIG. 3 is a diagram illustrating a detailed configuration of an unmanned aerial vehicle flight controller in an apparatus for integrated control of ignition of fireworks products and flight of unmanned aerial vehicles for a fireworks show according to the present disclosure.

Referring to FIG. 3, the unmanned aerial vehicle flight controller 120 according to the present disclosure generates flight control signals for control on the basis of the received flight information of the unmanned aerial vehicles.

To this end, the unmanned aerial vehicle flight controller 120 includes a flight control signal generator 121, a flight control signal converter 122, and a flight mode adjustment part 123.

The flight control signal generator 121 generates the flight control signals on the basis of the received flight information of the multiple unmanned aerial vehicles. Herein, the flight control signals are signals for controlling flight positions, flight paths, speeds, and angles according to a show scenario. As for the flight positions, the position correction values of the unmanned aerial vehicles are set by applying the center-of-gravity change values of the unmanned aerial vehicles that occur according to the ignition of the fireworks products, and by applying limit values of the momentary change dimensions of the fireworks products.

The flight control signal converter 122 converts the generated flight control signals into a supported format corresponding to the unmanned aerial vehicles.

The flight mode adjustment part 123 analyzes real-time state information received from the unmanned aerial vehicles to determine the flight states of the unmanned aerial vehicles, and adjusts the flight modes of the unmanned aerial vehicles for control on the basis of a result of determination.

More specifically, the flight mode adjustment part 123 determines whether the unmanned aerial vehicles are out of the paths thereof, on the basis of the flight state information received from the unmanned aerial vehicles which includes at least one selected from the group of the unique numbers, the speeds, the wind speeds, and the current positions to which the position correction values according to the ignition of the fireworks products are applied. When determining that an unmanned aerial vehicle is out of the path thereof, the flight mode adjustment part 123 outputs and transmits a mode adjustment control signal for changing the flight mode of the unmanned aerial vehicle to a manual flight mode.

Figure 4:
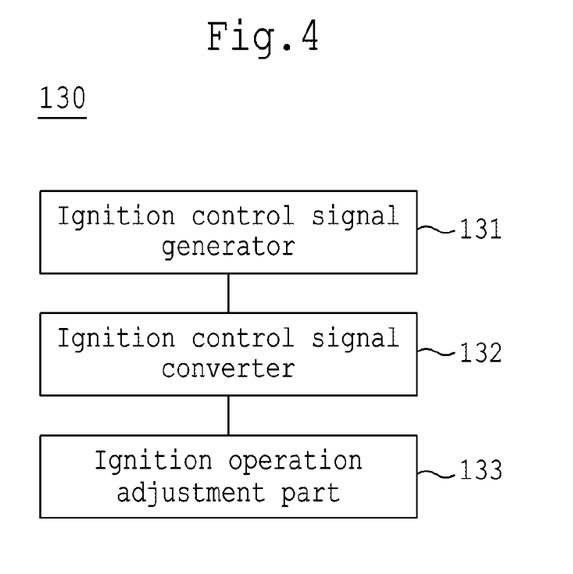
FIG. 4 is a diagram illustrating a detailed configuration of a fireworks product ignition controller in an apparatus for integrated control of ignition of fireworks products and flight of unmanned aerial vehicles for a fireworks show according to the present disclosure.

FIG. 4 is a diagram illustrating a detailed configuration of a fireworks product ignition controller in an apparatus for integrated control of ignition of fireworks products and flight of unmanned aerial vehicles for a fireworks show according to the present disclosure.

Referring to FIG. 4, the fireworks product ignition controller 130 according to the present disclosure generates ignition control signals for control on the basis of the received ignition information of the fireworks products.

To this end, the fireworks product ignition controller 130 includes an ignition control signal generator 131, an ignition control signal converter 132, and an ignition operation adjustment part 133.

The ignition control signal generator 131 generates the ignition control signals on the basis of the received ignition information of the multiple fireworks products.

The ignition control signal converter 132 converts the generated ignition control signals into a supported format corresponding to the fireworks products.

The ignition operation adjustment part 133 analyzes real-time state information received from the fireworks products to determine the ignition states of the fireworks products, and adjusts the ignition operations of the fireworks products for control on the basis of a result of determination.

More specifically, the ignition operation adjustment part 133 determines whether the ignition of the fireworks products is abnormal, on the basis of the ignition state information received from the fireworks products which includes at least one selected from the group of the unique numbers, the current positions, the speeds, the wind speeds, and the previous ignition history information. When determining that the ignition of a fireworks product is abnormal, the ignition operation adjustment part 133 outputs and transmits an operation adjustment control signal for stopping the ignition operation of the fireworks product for adjustment.

Figure 5:
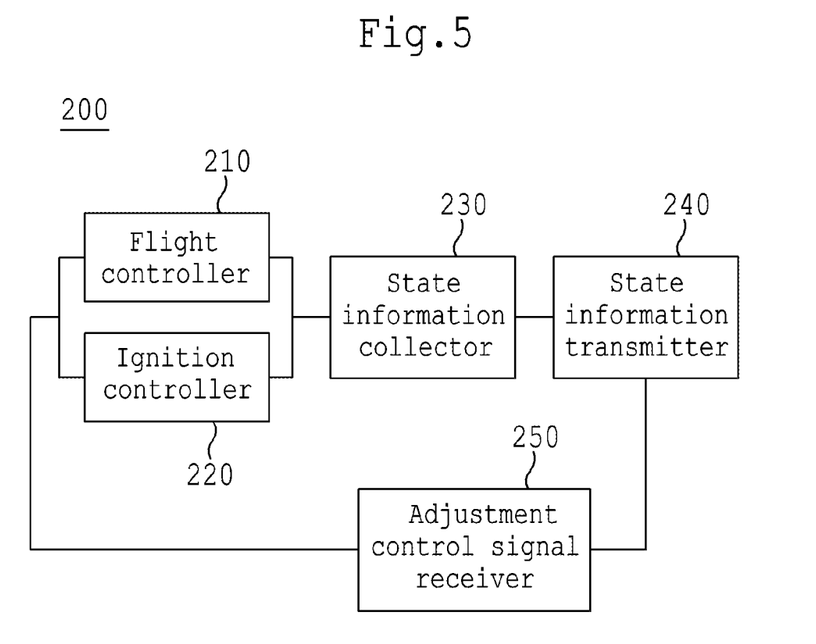
FIG. 5 is a diagram illustrating a configuration of an unmanned aerial vehicle that is applied to an apparatus for integrated control of ignition of fireworks products and flight of unmanned aerial vehicles for a fireworks show according to the present disclosure.

FIG. 5 is a diagram illustrating a configuration of an unmanned aerial vehicle that is applied to an apparatus for integrated control of ignition of fireworks products and flight of unmanned aerial vehicles for a fireworks show according to the present disclosure.

Referring to FIG. 5, the appearance of the unmanned aerial vehicle 200 according to the present disclosure is schematically composed of a body and a fireworks product provided at the body.

The unmanned aerial vehicle 200 includes a flight controller 210, an ignition controller 220, a state information collector 230, a state information transmitter 240, and an adjustment control signal receiver 250.

The flight controller 210 receives the flight control signal converted according to the supported format and the unmanned aerial vehicle 200 flies on the basis of the received flight control signal. When the mode adjustment control signal is received, the flight controller 210 adjusts the flight mode for control.

The ignition controller 220 receives the ignition control signal converted according to the supported format, and ignites the fireworks product provided at the unmanned aerial vehicle on the basis of the received ignition control signal. When the operation adjustment control signal is received, the ignition controller 220 adjusts the ignition operation of the fireworks product for control.

The state information collector 230 collects the flight state information and the ignition state information of the fireworks product in real time.

The state information transmitter 240 transmits the collected flight state information and the collected ignition state information of the fireworks product.

The adjustment control signal receiver 250 receives the transmitted mode adjustment control signal and the transmitted operation adjustment control signal.

Figure 6:
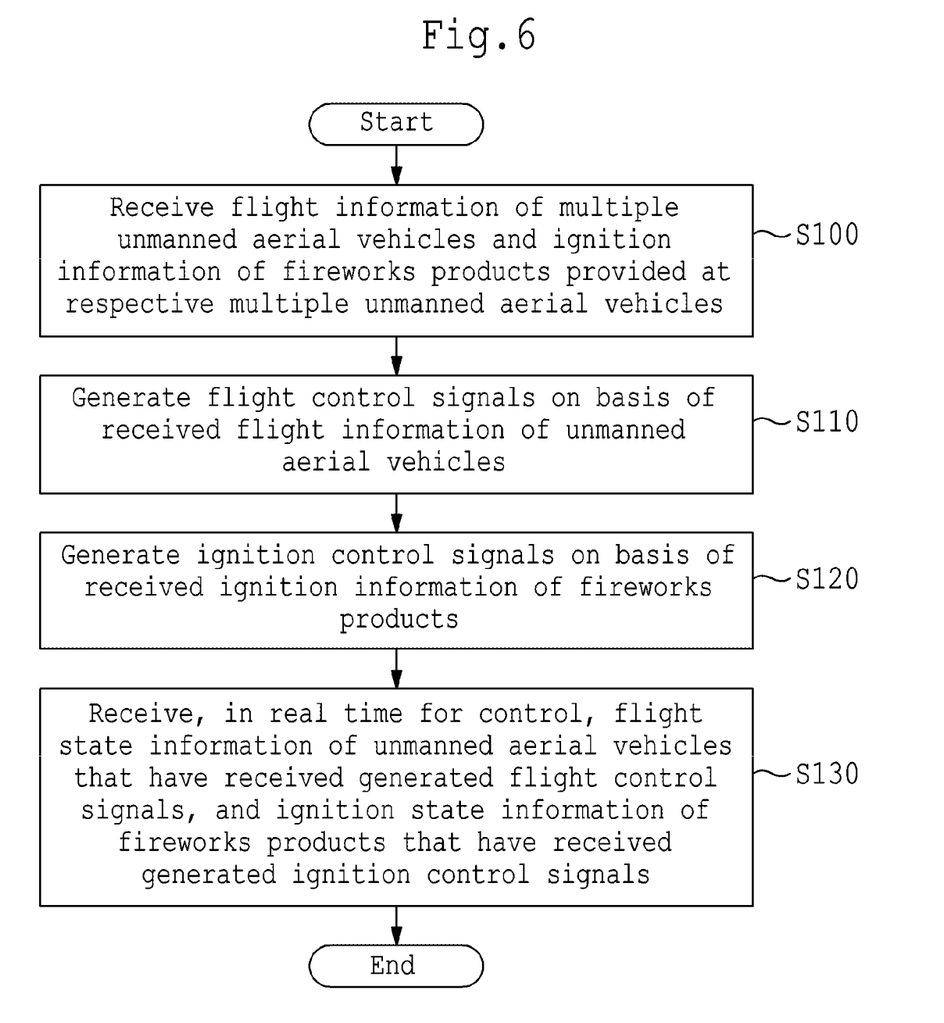
FIG. 6 is a flowchart illustrating a method for integrated control of ignition of fireworks products and flight of unmanned aerial vehicles for a fireworks show according to the present disclosure.

FIG. 6 is a flowchart illustrating a method for integrated control of ignition of fireworks products and flight of unmanned aerial vehicles for a fireworks show according to the present disclosure.

Referring to FIG. 6, the method for integrated control of ignition of the fireworks products and flight of the unmanned aerial vehicles for a fireworks show according to the present disclosure uses the above-described apparatus for integrated control of ignition of the fireworks products and flight of the unmanned aerial vehicles for a fireworks show. Hereinafter, a redundant description will be omitted.

First, flight information of multiple unmanned aerial vehicles and ignition information of fireworks products provided at the respective multiple unmanned aerial vehicles are received at step S100.

At step S100, the flight information is received from a manager terminal, wherein the flight information includes at least one selected from the group of flight positions, flight paths, speeds of the multiple unmanned aerial vehicles, and center-of-gravity change values thereof according to the ignition of the fireworks products. In addition, the ignition information receiver 112 receives the ignition information from the manager terminal, wherein the ignition information includes at least one selected from the group of ignition time points, the number of ignitions, and momentary change dimensions of the multiple fireworks products.

Next, on the basis of the received flight information of the unmanned aerial vehicles, flight control signals are generated for control at step S110.

Next, on the basis of the received ignition information of the fireworks products, ignition control signals are generated for control at step S120.

Next, flight state information of the unmanned aerial vehicles that have received the generated flight control signals, and ignition state information of the fireworks products that have received the generated ignition control signals are received in real time at step S130

At step S130, the flight state information is received from the unmanned aerial vehicles, wherein the flight state information includes at least one selected from the group of unique numbers, speeds, wind speeds, and current positions to which position correction values according to the ignition of the fireworks products are applied. In addition, the ignition state information is received from the fireworks products, wherein the ignition state information includes at least one selected from the group of unique numbers, current positions, speeds, wind speeds, and previous ignition history information.

Figure 7:
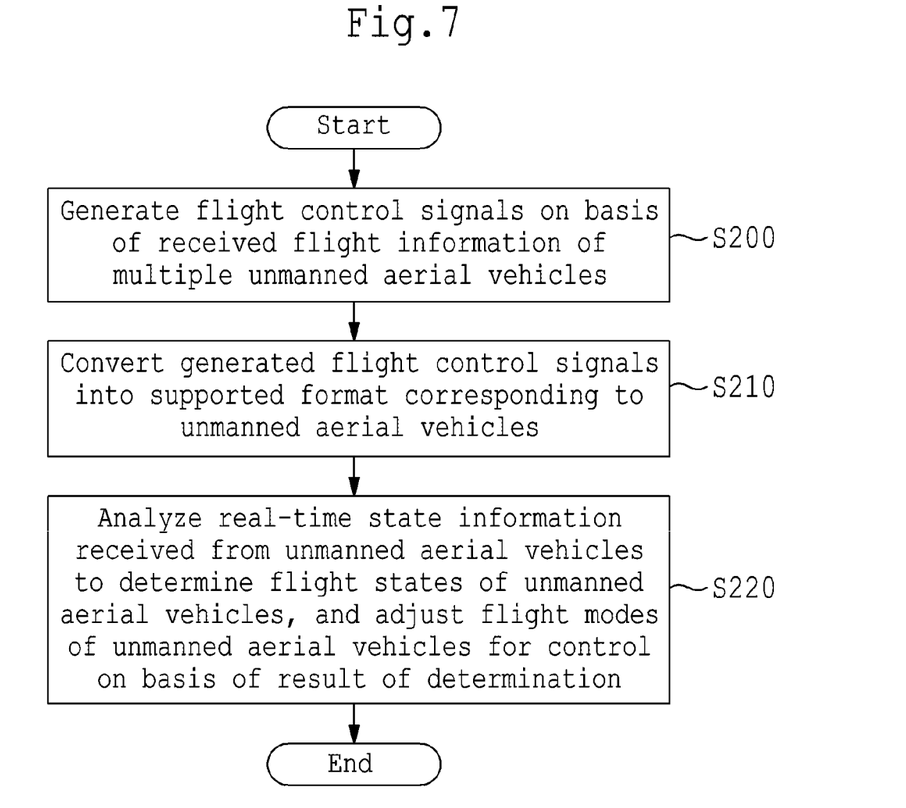
FIG. 7 is a flowchart illustrating in detail a step of generating flight control signals on the basis of received flight information of the unmanned aerial vehicles, in the method for integrated control of ignition of the fireworks products and flight of the unmanned aerial vehicles for a fireworks show according to the present disclosure.

FIG. 7 is a flowchart illustrating in detail a step of generating flight control signals on the basis of received flight information of the unmanned aerial vehicles, in the method for integrated control of ignition of the fireworks products and flight of the unmanned aerial vehicles for a fireworks show according to the present disclosure.

Referring to FIG. 7, first, flight control signals are generated on the basis of the received flight information of the multiple unmanned aerial vehicles at step S200. At step S200, the flight control signals are signals for controlling flight positions, flight paths, speeds, and angles according to a show scenario. As for the flight positions, the position correction values of the unmanned aerial vehicles are set by applying the center-of-gravity change values of the unmanned aerial vehicles that occur according to the ignition of the fireworks products, and by applying limit values of the momentary change dimensions of the fireworks products.

Next, the generated flight control signals are converted into a supported format corresponding to the unmanned aerial vehicles at step S210.

Next, real-time state information received from the unmanned aerial vehicles is analyzed to determine the flight states of the unmanned aerial vehicles, and on the basis of a result of determination, the flight modes of the unmanned aerial vehicles are adjusted for control at step S220.

At step S220, whether the unmanned aerial vehicles are out of the paths thereof is determined on the basis of the flight state information received from the unmanned aerial vehicles which includes at least one selected from the group of the unique numbers, the speeds, the wind speeds, and the current positions to which the position correction values according to the ignition of the fireworks products are applied. When it is determined that an unmanned aerial vehicle is out of the path thereof, a mode adjustment control signal for changing the flight mode of the unmanned aerial vehicle to a manual flight mode is output and transmitted.

Figure 8:
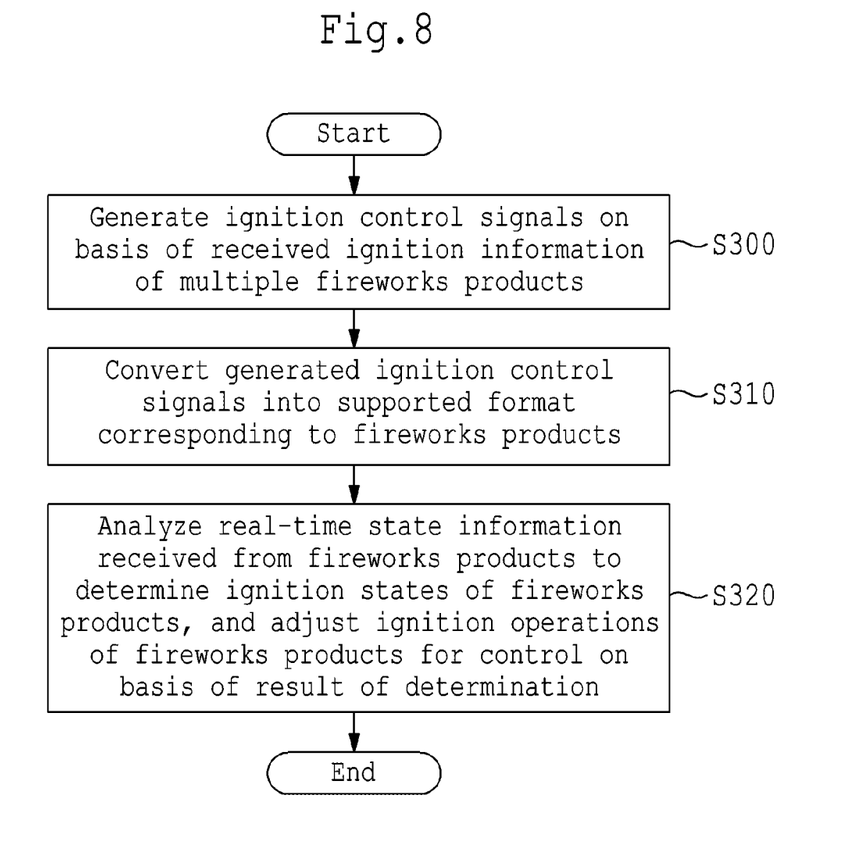
FIG. 8 is a flowchart illustrating in detail a step of generating ignition control signals on the basis of received ignition information of the fireworks products, in the method for integrated control of ignition of the fireworks products and flight of the unmanned aerial vehicles for a fireworks show according to the present disclosure.

FIG. 8 is a flowchart illustrating in detail a step of generating ignition control signals on the basis of received ignition information of the fireworks products, in the method for integrated control of ignition of the fireworks products and flight of the unmanned aerial vehicles for a fireworks show according to the present disclosure.

Referring to FIG. 8, first, ignition control signals are generated on the basis of the received ignition information of the multiple fireworks products at step S300.

Next, the generated ignition control signals are converted into a supported format corresponding to the fireworks products at step S310.

Next, real-time state information received from the fireworks products is analyzed to determine the ignition states of the fireworks products, and on the basis of a result of determination, the ignition operations of the fireworks products are adjusted for control at step S320.

At step S320, whether the ignition of the fireworks products is abnormal is determined on the basis of the ignition state information received from the fireworks products which includes at least one selected from the group of the unique numbers, the current positions, the speeds, the wind speeds, and the previous ignition history information. When it is determined that the ignition of a fireworks product is abnormal, an operation adjustment control signal for stopping the ignition operation of the fireworks product for adjustment is output and transmitted.

Figure 9:
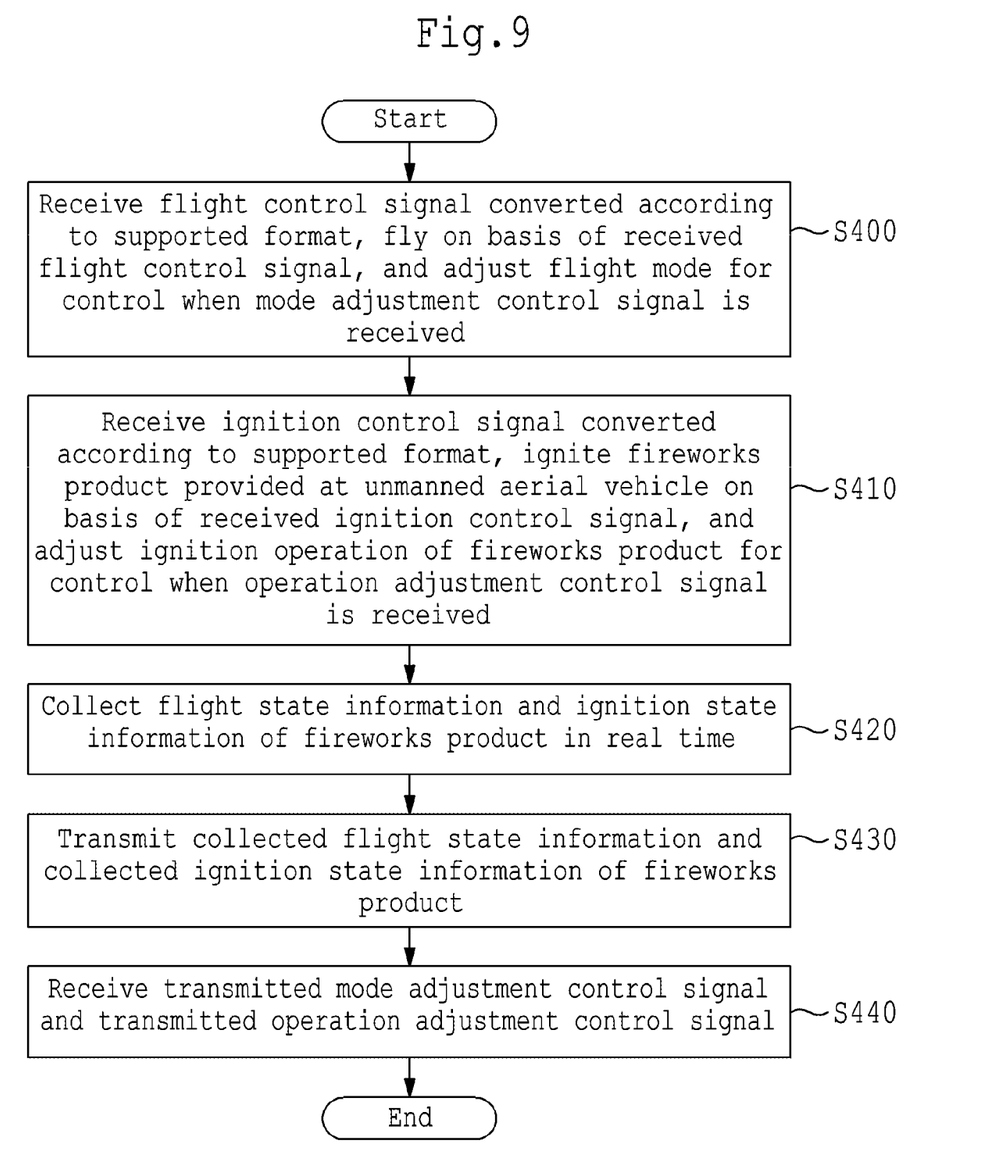
FIG. 9 is a flowchart illustrating how an unmanned aerial vehicle is operated on the basis of a received flight control signal and a received ignition control signal, in the method for integrated control of ignition of fireworks products and flight of unmanned aerial vehicles for a fireworks show according to the present disclosure.

FIG. 9 is a flowchart illustrating how an unmanned aerial vehicle is operated on the basis of the received flight control signal and the received ignition control signal, in the method for integrated control of ignition of fireworks products and flight of unmanned aerial vehicles for a fireworks show according to the present disclosure.

Referring to FIG. 9, first, the flight control signal converted according to the supported format is received and the unmanned aerial vehicle flies on the basis of the received flight control signal. When the mode adjustment control signal is received, the flight mode is adjusted for control at step S400.

Next, the ignition control signal converted according to the supported format is received and the fireworks product provided at the unmanned aerial vehicle is ignited on the basis of the received ignition control signal. When the operation adjustment control signal is received, the ignition operation of the fireworks product is adjusted for control at step S410.

Next, the flight state information and the ignition state information of the fireworks product are collected in real time at step S420.

Next, the collected flight state information and the collected ignition state information of the fireworks product are transmitted at step S430.

Next, the transmitted mode adjustment control signal and the transmitted operation adjustment control signal are received at step S440.

The embodiments of the subject matter described herein may be realized as one or more computer program products, that is, one or more modules related to computer program commands encoded on a tangible program medium for execution by a data processing device or for controlling the operation of the data processing device. The tangible program medium may be a radio signal or a computer-readable medium. The radio signal is an artificially generated signal, for example, a machine-generated electrical, optical, or electromagnetic signal, which is generated to encode information for transmission to a suitable receiver device for execution by a computer. The computer-readable medium may be a machine-readable storage device, a machine-readable storage substrate, a memory device, a combination of materials that affect a machine-readable radio signal, or a combination of one or more thereof.

A computer program (also known as a program, software, software application, script, or code) may be written in any form of programming language including compiled or interpreted languages, or priori or procedural languages. The computer program may be deployed in any form, including a standalone program or a module, component, subroutine, or other units suitable for use in a computer environment.

The computer program does not necessarily correspond to a file of a file device. The computer program may be stored in a single file dedicated to the program in question, or in multiple coordinated files (for example, files that store one or more modules, subprograms, or portions of code), or in a portion of a file that holds other programs or data (for example, one or more scripts stored in a markup language document).

The computer program may be deployed to be executed on one computer or on multiple computers that are located at one site or distributed across multiple sites and interconnected by a communication network.

Additionally, the logic flows and the structural block diagrams herein describe an act and/or a specific method supported by functions and steps supported by the disclosed structural means. The logic flows and the structural block diagrams can be used to set corresponding software structures and algorithms and their equivalents.

The processes and logic flows described herein may be performed by one or more programmable processors executing one or more computer programs to perform functions by operating on received data and generating output.

The processors suitable for the execution of the computer program include, for example, both general purpose and special purpose microprocessors and any one or more processors of any kind of digital computer. Generally, a processor will receive instructions and data from read-only memory or random-access memory or both.

The essential elements of a computer are one or more memory devices for storing instructions and data, and a processor for performing the instructions. In addition, generally, a computer may receive data from or transmit data to one or more large storage devices for storing data, such as magnetic, magneto-optical, or optical disks, or may be coupled to or may include the large storage devices so as to perform both receiving and transmitting operations. However, the computers do not need to have the devices.

The present description provides the best mode of the present disclosure to describe the present disclosure, and provides an example for enabling those skilled in the art to manufacture and use the present disclosure. The specification does not limit the present disclosure to the specific terms presented.

Although the present disclosure has been described for illustrative purposes, those skilled in the art will appreciate that various modifications, additions, and substitutions are possible, without departing from the scope and spirit of the present disclosure. In short, to achieve the intended effect of the present disclosure, it is not necessary to include all functional blocks shown in the drawings, or to follow all the sequences shown in the drawings in the order as shown therein. Note that even if it is not, it may fall within the technical scope of the present disclosure disclosed in the claims.

What is claimed is:

1. An apparatus for integrated control of ignition of fireworks products and flight of multiple unmanned aerial vehicles for a fireworks show, the apparatus comprising:
    an information input part configured to receive flight information of the multiple unmanned aerial vehicles and ignition information of the fireworks products provided at respective multiple unmanned aerial vehicles;
    an unmanned aerial vehicle flight controller configured to generate flight control signals based on received flight information of the unmanned aerial vehicles;
    a fireworks product ignition controller configured to generate ignition control signals based on received ignition information of the fireworks products; and
    a state information receiver configured to receive in real time flight state information of the unmanned aerial vehicles that have received generated flight control signals, and ignition state information of the fireworks products that have received generated ignition control signals,
    wherein the state information receiver is configured to receive the flight state information from the unmanned aerial vehicles and the ignition state information from the fireworks products, wherein the flight state information includes at least one selected from a group of unique numbers, speeds, wind speeds, and current positions to which position correction values according to ignition of the fireworks products are applied, and the ignition state information includes at least one selected from a group of unique numbers, current positions, speeds, wind speeds, and previous ignition history information.

2. The apparatus of claim 1, wherein the information input part comprises:
    a flight information receiver configured to receive, from a manager terminal, the flight information including at least one selected from a group of flight positions, flight paths, and speeds of the multiple unmanned aerial vehicles; and
    an ignition information receiver configured to receive, from the manager terminal, the ignition information including at least one selected from a group of ignition time points and a number of ignitions of multiple fireworks products.

3. The apparatus of claim 1 wherein the unmanned aerial vehicle flight controller comprises:
    a flight control signal generator configured to generate flight control signals based on received flight information of the multiple unmanned aerial vehicles;
    a flight control signal converter configured to convert generated flight control signals into a supported format corresponding to the unmanned aerial vehicles; and
    a flight mode adjustment part configured to analyze real-time state information received from the unmanned aerial vehicles to determine flight states of the unmanned aerial vehicles, and adjust flight modes of the unmanned aerial vehicles for control based on a result of determination.

4. The apparatus of claim 3, wherein the flight mode adjustment part is configured to:
    determine whether the unmanned aerial vehicles are out of paths thereof, based on the flight state information received from the unmanned aerial vehicles which includes at least one selected from a group of unique numbers, speeds, wind speeds, and current positions to which position correction values according to ignition of the fireworks products are applied; and
    output, when determining that at least one of the unmanned aerial vehicles is out of the paths, a mode adjustment control signal for changing a flight mode of the at least one of the unmanned aerial vehicles to a manual flight mode.

5. The apparatus of claim 1, wherein the fireworks product ignition controller comprises:
    an ignition control signal generator configured to generate ignition control signals based on received ignition information of multiple fireworks products;
    an ignition control signal converter configured to convert generated ignition control signals into a supported format corresponding to the fireworks products; and
    an ignition operation adjustment part configured to analyze real-time state information received from the fireworks products to determine ignition states of the fireworks products, and adjust ignition operations of the fireworks products for control based on a result of determination.

6. The apparatus of claim 5, wherein the ignition operation adjustment part is configured to
    determine whether ignition of the fireworks products is abnormal, based on the ignition state information received from the fireworks products which includes at least one selected from a group of unique numbers, current positions, speeds, wind speeds, and previous ignition history information; and
    output, when determining that ignition of at least one of the fireworks products is abnormal, an operation adjustment control signal for stopping the ignition operation of the at least one of the fireworks products for adjustment.

7. The apparatus of claim 1, wherein each of the unmanned aerial vehicles comprises:
    a flight controller configured to receive the flight control signal converted according to a supported format corresponding to the unmanned aerial vehicles, and make the unmanned aerial vehicle fly based on the received flight control signal, the flight controller adjusting a flight mode for control when a mode adjustment control signal is received;
    an ignition controller configured to receive the ignition control signal converted according to a supported format corresponding to the fireworks products, and ignite the fireworks product provided at the unmanned aerial vehicle based on the received ignition control signal, the ignition controller adjusting an ignition operation of the fireworks product for control when an operation adjustment control signal is received;
    a state information collector configured to collect the flight state information and the ignition state information of the fireworks product in real time;

a state information transmitter configured to transmit the collected flight state information and the collected ignition state information of the fireworks product; and an adjustment control signal receiver configured to receive the transmitted mode adjustment control signal and the transmitted operation adjustment control signal.

8. A method for integrated control of ignition of fireworks products and flight of multiple unmanned aerial vehicles for a fireworks show, the method comprising: receiving, by an information input part, flight information of the multiple unmanned aerial vehicles and ignition information of the fireworks products provided at respective multiple unmanned aerial vehicles;

generating, by an unmanned aerial vehicle flight controller, flight control signals based on received flight information of the unmanned aerial vehicles;

generating, by a fireworks product ignition controller, ignition control signals based on received ignition information of the fireworks products; and receiving in real time, by a state information receiver, flight state information of the unmanned aerial vehicles that have received generated flight control signals and ignition state information of the fireworks products that have received generated ignition control signals, wherein the generating of the ignition control signals based on the received ignition information of the fireworks products comprises:

generating ignition control signals based on received ignition information of multiple fireworks products;

converting generated ignition control signals into a supported format corresponding to the fireworks products; and analyzing real-time state information received from the fireworks products to determine ignition states of the fireworks products, and adjusting ignition operations of the fireworks products for control based on a result of determination, and wherein at the analyzing of the real-time state information received from the fireworks products to determine the ignition states of the fireworks products, and the adjusting of the ignition operations of the fireworks products for control based on the result of determination, whether ignition of the fireworks products is abnormal is determined based on the ignition state information received from the fireworks products that includes at least one selected from a group of unique numbers, current positions, speeds, wind speeds, and previous ignition history information, and when it is determined that ignition of at least one of the fireworks products is abnormal, an operation adjustment control signal for stopping the ignition operation of the at least one of the fireworks products for adjustment is output.

9. The method of claim 8, wherein the generating of the flight control signals based on the received flight information of the unmanned aerial vehicles comprises:

generating flight control signals based on received flight information of the multiple unmanned aerial vehicles;

converting generated flight control signals into a supported format corresponding to the unmanned aerial vehicles; and analyzing real-time state information received from the unmanned aerial vehicles to determine flight states of the unmanned aerial vehicles, and adjusting flight modes of the unmanned aerial vehicles for control based on a result of determination.

10. The method of claim 9, wherein at the analyzing of the real-time state information received from the unmanned aerial vehicles to determine the flight states of the unmanned aerial vehicles, and the adjusting of the flight modes of the unmanned aerial vehicles for control based on the result of determination, whether the unmanned aerial vehicles are out of paths thereof is determined based on the flight state information received from the unmanned aerial vehicles that includes at least one selected from a group of unique numbers, speeds, wind speeds, and current positions to which position correction values according to ignition of the fireworks products are applied, and when it is determined that at least one of the unmanned aerial vehicles is out of the paths, a mode adjustment control signal for changing a flight mode of the at least one of the unmanned aerial vehicles to a manual flight mode is output.

* * * * *